Patented Apr. 1, 1930

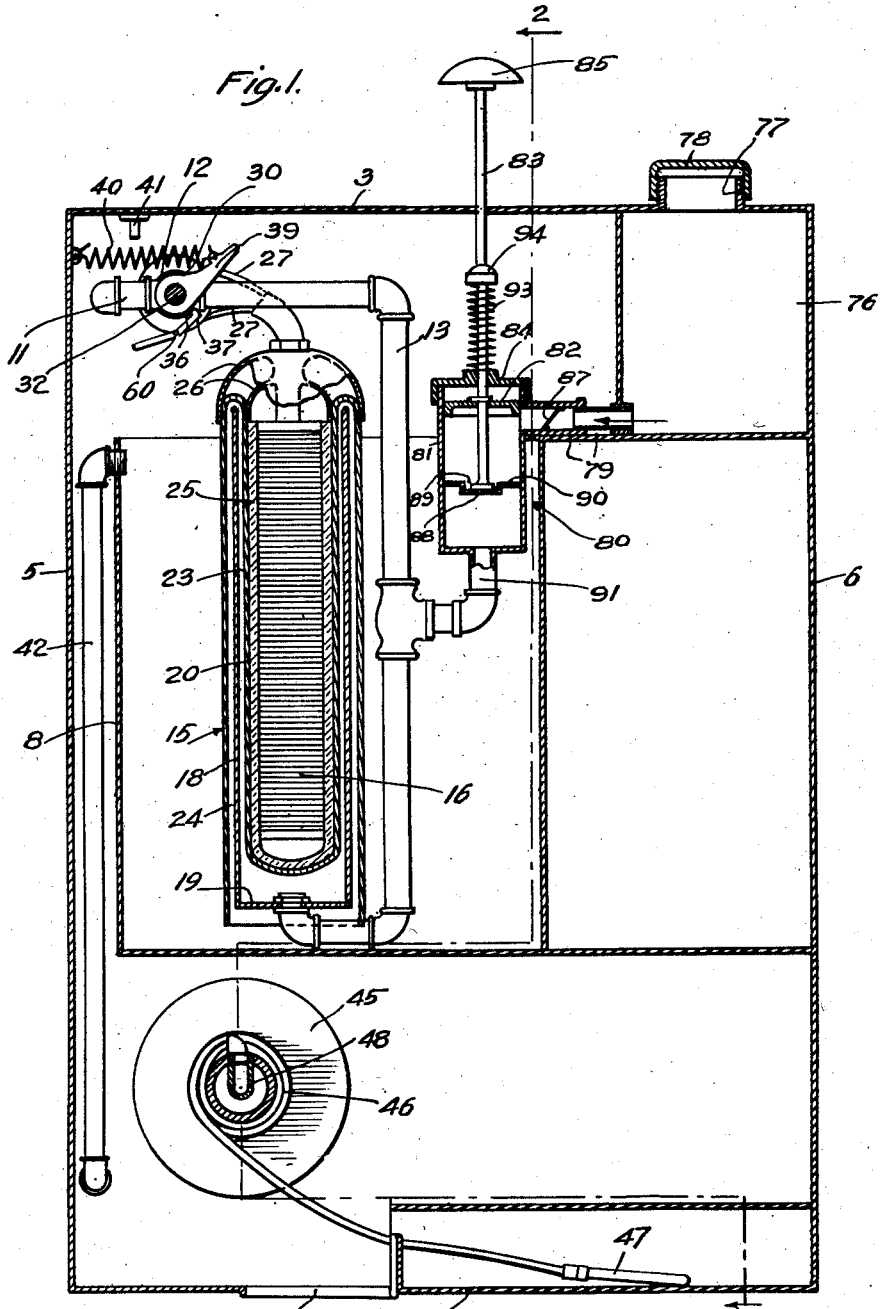

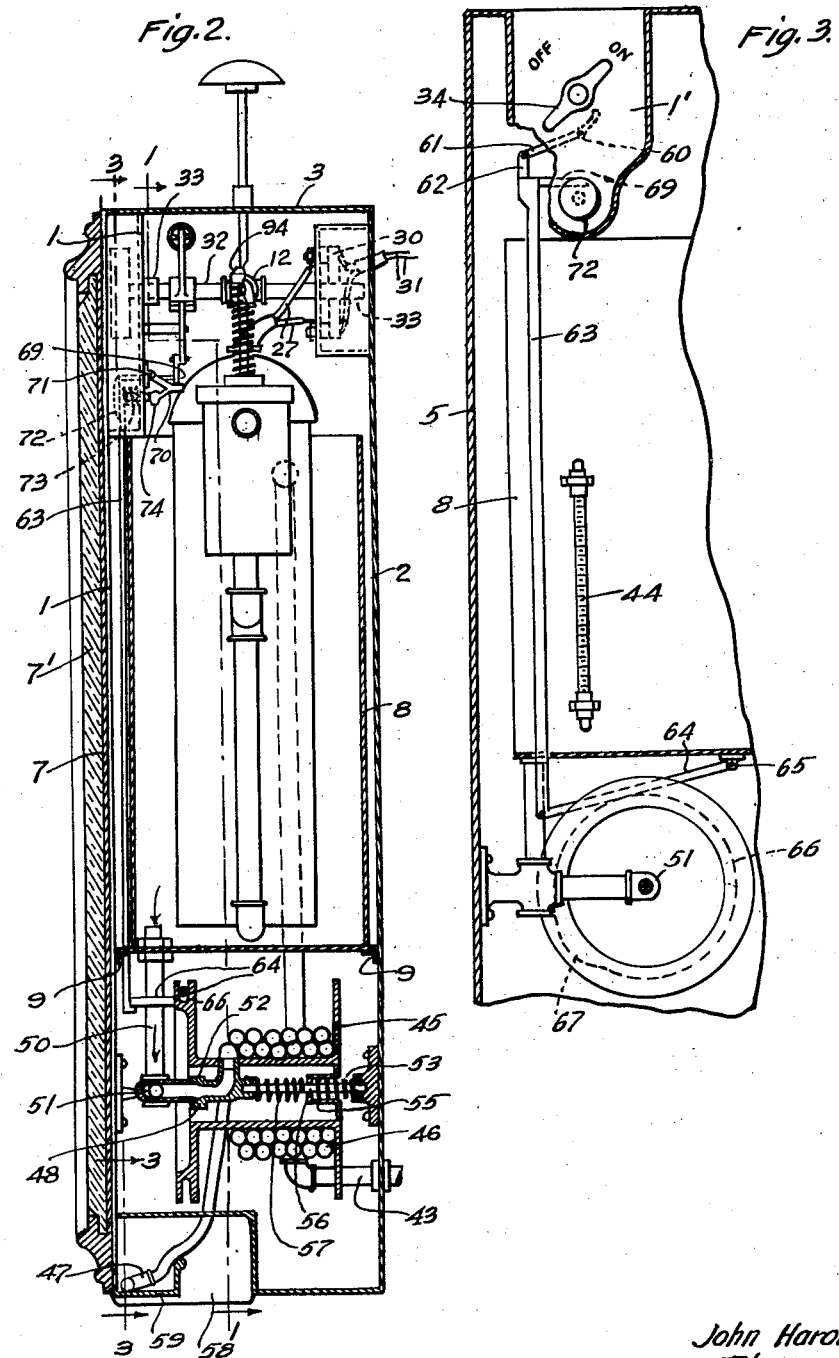

1,752,698

UNITED STATES PATENT OFFICE

JOHN HAROLD ROGERS AND THOMAS CONCHA, OF LOS ANGELES, CALIFORNIA

WATER HEATING AND DISPENSING MEANS

Application filed May 7, 1928. Serial No. 275,738.

This invention relates to apparatus for the convenient heating and dispensing of water for use in internal baths, douches, enemas, etc. The principal object of the invention is to provide an apparatus which may be conveniently mounted in any suitable position or built in as a permanent fixture and which can be conveniently operated to automatically heat and dispense a certain quantity of water.

A further object of the invention is to provide, if desired, for delivery of antiseptic agents to the water.

The apparatus comprises essentially a water receptacle, means controlled by manual operation for filling said receptacle with water at the desired temperature, and means operable either automatically or manually for shutting off the supply of water and also shutting off the heating device, whereupon the receptacle may be emptied through the usual hose or other outlet means. The apparatus also preferably includes manually operable means for delivering a measured quantity of antiseptic, or other liquid agent, to the water in the receptacle. Other advantageous features of the apparatus will be apparent from the following description.

The accompanying drawings illustrate embodiments of the invention, and referring thereto:

Fig. 1 is a vertical section on line 1—1 in Fig. 2.

Fig. 2 is a vertical section on line 2—2 in Fig. 1.

Fig. 3 is a partial section on line 3—3 in Fig. 1, with part of the outer casing wall broken away.

The apparatus is shown as comprising an outer casing having front wall 1, rear wall 2, top 3 and side walls 5 and 6. The front wall may if desired be hinged or otherwise mounted to permit opening or removal thereof for the purpose of inspecting, cleaning, or replacing any of the inside parts. A door 7 provided with mirror 7' may also be hingedly mounted in front of the casing, so as to give the cabinet an external appearance similar to that of the ordinary medicine cabinet. Within said outer casing is mounted a water receptacle 8, consisting for example of a rectangular tank and supported on the casing as indicated at 9. The water inlet pipe 11 enters through the rear wall of the casing and is provided with a valve 12 for opening and closing the same. Said pipe then passes downwardly as indicated at 13 to adjacent the bottom of tank 8 where it opens upwardly into the bottom of a heating device 15. Said heating device comprises a heating element consisting, for example, of an electric heating coil 16 and means for causing the water delivered thereto to pass in the form of a relatively thin layer around said heating unit so as to be heated thereby. For example the device may comprise a cylindrical member 18 closed at the bottom as at 19 and open at its upper end, and another member having an inner closed cylinder 20 fitting within the tube 18 and an outer cylinder 21 extending down outside the member 18 so as to cause the water delivered to the interior of the member 18 to pass first upwardly in the space 23 between said member and the cylinder 20 and hence close to the heating element, then over the upper edge of member 18, then downwardly in the space 24 between member 18 and cylinder 21 and then out into the interior of receptacle 8. A thimble or sleeve of suitable refractory clay or the like may be provided between heating element 16 and cylinder 20. A cover or cap 26 may be fitted over the upper end of the heating device to provide a means of connection of the electrical conductors 27 to the heating element.

The electrical connections 27 for the heating coil may be connected to the fixed or moving contacts of switch 30, while the other set of contacts may be connected by wires 31 to any suitable electric power supply system such as the ordinary electric lighting system in a house. The moving contacts of switch 30 and the operating member of valve 12 may be mounted upon a shaft 32 which is rotatably mounted in bearings 33. Said shaft extends through a recessed portion 1' of the front wall of the casing and is provided at its outer end with a knob or handle 34 for manual operation thereof. Said shaft is also provided with a catch member having a lip or projection 36 adapted to be engaged and held by a pawl 37 when the handle 34 is operated to open valve 12 and close switch 30. Arm 39 on shaft 32 is connected to spring 40 for rotating said shaft to position to close valve 12 and open switch 30 upon release of pawl member 37 as hereinafter described.

Overflow pipe 42 leads from adjacent the top of receptacle 8, out through the rear wall 2 as indicated at 43, to any suitable drain means, so as to permit overflow of water until the same is treated to the desired temperature, and a thermometer 44 may be mounted in suitable position in front of receptacle 8, with its bulb projecting into said receptacle. The front wall 1 of the outer casing may be cut away in front of said thermometer to permit reading of the water temperature.

Within the outer casing and below receptacle 8, is mounted a winding reel 45 upon which is wound a rubber hose 46 having a nozzle 47 at its free end. The inner end of hose 46 is connected to a hollow trunnion member 48. Outlet pipe 50 leads from the bottom of receptacle 8 to fitting 51 which engages in hollow trunnion 48 so as to cause water to pass from pipe 50 into said hollow trunnion and thence into the hose 46. Trunnion 48 and fitting 51 may be provided with bevelled faces as indicated at 52 and a spring 53 may be provided exerting an endwise thrust on the winding reel so as to hold said parts in tight engagement. The winding reel may be rotatably mounted by means of the above described hollow trunnion and by means of a bearing 55 fitting over a fixed shaft 56. A rewinding spring 57 may be connected at one end to the shaft 56 and at the other end to trunnion member 48 or to the reel itself so as to rotate said reel in a clockwise direction (in Figs. 1 and 3) and re-wind the hose 46 thereon. An opening 58 may be provided in the bottom of the casing, through which the hose 46 may be drawn for use, and a ledge or shelf 59 may also be provided, upon which the end of said hose and nozzle 47 may rest when not in use.

The means for automatically releasing the pawl member 37 from catch means 36 may be as follows. Said pawl member is shown as pivoted at 60 and having an arm 61 whose outer end is connected to an off-set arm 62 at the top of a link 63, which is connected at its lower end to an arm 64 pivotally mounted at 65. Said arm 64 may rest in an annular groove 66 on the winding reel 45, the bottom of said groove being provided with a cam or rounded projection 67 adapted to lift arm 64 upon rotation of said winding reel. In order to also permit manual release of pawl 37, the arm 62 may also be connected to an arm 69. A lifting member 70 extends beneath arm 69 and is pivotally mounted at 71 and push button 72 provided with an outwardly acting spring 73 is operable to engage a rounded portion 74 on lifting member 70 and swing said lifting member upwardly about its pivot 71.

The means for delivering antiseptic or other liquid agent to the water may comprise a receptacle or tank 76 adapted to contain a quantity of suitable liquid antiseptic agent, said receptacle having a filling opening 77 provided with cap 78, and being preferably of sufficient size to hold enough antiseptic agent for several operations of the apparatus. Pipe 79 leads from the bottom of receptacle 76 to a measuring device 80 consisting of a cylinder 81 in which is mounted a plunger or piston 82. The stem 83 of said plunger extends upwardly through the cover 84 and through the top wall 3 of the outer casing and is provided at its upper end with a head or button 85 to permit manual depression of plunger 82. A small check valve 87, such as a swing check valve, may be provided in the inlet pipe 79, said check valve being adapted to permit flow of liquid from tank 76 into the interior of cylinder 81 while preventing flow in the reverse direction. Stem 83 may also be provided at its lower end with a valve member 88 adapted to engage seat 89 when plunger 82 is in raised position and prevent communication between the portion of cylinder 81 above the horizontal partition plate 90 and the portion below said plate. A pipe 91 leads from the bottom of cylinder 81 to water inlet pipe 13. Spring 93 acts against member 94 to automatically raise stem 83 and plunger 82 to the position shown upon release of the downward pressure thereon.

The operation of the apparatus above described is as follows:

Under normal conditions when the apparatus is out of use, the receptacle 8 is empty, valve 12 is closed and the switch 30 is open. To start the device in operation handle 34 is turned in a clockwise direction to the "on" position as indicated in Fig. 3, until the catch member 36 passes over the pawl 37, which holds the shaft 32 in this position, at which time valve 12 is opened and switch 30 is closed. The single manual operation of handle 34 thus serves both to turn on the water supply to the receptacle and also to start the heating element 16 in operation.

The water then passes through pipes 11 and 13 to the interior of the heating device 15, thence upwardly in the annular space 23 and around the heating element 16 and then downwardly through the annular space 24 and out into the receptacle. Due to such passage in a relatively thin layer in close proximity to the heating element the water is quickly heated and delivered to the receptacle at the desired temperature. In case the receptacle should become filled before it is desired to use the contents thereof, the water will simply overflow through pipe 42 and pass off through the drain means.

If it is desired to deliver an antiseptic or other liquid agent to the water, the button 85 may be depressed, whereupon a measured quantity of such agent is forced from the interior of cylinder 81 through pipe 91 and is thoroughly mixed with the water entering through pipe 13. During the downward motion of plunger 82 the check valve 87 closes tightly due to the pressure beneath said plunger, until the plunger has passed below the level of pipe 79, after which a further quantity of the antiseptic or other agent flows from container 76 into cylinder 81 above the plunger 82. When the button 85 is released, spring 93 forces the plunger upwardly and the agent passes around the edges of said plunger into the space beneath the plunger, due to the fact that return of said agent to tank 76 is again prevented by check valve 87. The valve member 88 then engages seat 89 to positively prevent passage of any further amount of liquid from above said valve into the water and also prevent diffusion of water back into the liquid above said valve and beneath the plunger 82.

When the water in receptacle 8 has been heated to the desired temperature as indicated by thermometer 44, the water supply and electric current may be shut off either automatically or manually. If it is desired to make use of the contents of receptacle 8 at once, the hose 46 may be unwound from winding reel 45, the resulting rotation of the winding reel bringing the projection or cam 67 beneath arm 64 which acts through link 63 and arm 62 to release the pawl member 37 from catch means 36 and permit spring 40, acting on arm 39, to restore valve 12 to closed position and switch 30 to open position, at which time the handle 34 is moved to the "off" position shown in Fig. 3. Such movement of the valve and switch may be limited in any suitable manner, as for example by engagement of arm 39 with stop member 41. If, on the other hand, it is desired to shut off the water supply and the heating current without unwinding the hose, this may be accomplished by pressing on button 72 whereupon the inner end of the stem of push button 72 will act to swing the lifting member 70 upwardly, thus raising arm 62 and relasing pawl member 37.

The apparatus therefor provides a convenient means for administering internal baths, douches, enemas and in general for any purpose in which a supply of a definite quantity of water at a certain temperature is desired. The temperature may be made such as is suited to the intended purpose by the use of the proper size of heating coil. It therefore forms an advantageous piece of equipment for doctors' offices and hospitals, as well as for private homes, hotels and apartments.

We claim:

1. A water heating and dispensing apparatus comprising a water receptacle, means for supplying water to said receptacle and for heating the water so supplied, means permitting overflow of water from said receptacle until the water in the receptacle reaches the desired temperature, outlet means connected adjacent the bottom of said receptacle and including a hose wound upon a self-winding reel, and means, operable upon unwinding of said hose from said reel, to simultaneously shut off the supply of water and the heating means therefor.

2. An apparatus as set forth in claim 1 and comprising in addition means for delivering a measured quantity of antiseptic agent to the water entering the receptacle.

3. A water heating and dispensing apparatus, means for supplying water to said receptacle and for heating the water as it is so supplied, manually operable means for simultaneously turning on the supply of water and the heating means therefor, means causing the water supply to be maintained and the heating means therefore to be kept in operation upon such movement of said manually operable means, means permitting overflow of water from said receptacle until the water in the receptacle reaches the desired temperature, outlet means connected adjacent the bottom of said receptacle, and manually controlled means for simultaneously shutting off the supply of water and the heating means therefor.

In testimony whereof we have hereunto subscribed our names this 27th day of April, 1928.

JOHN HAROLD ROGERS.
THOMAS CONCHA.